United States Patent [19]
Harrell

[11] Patent Number: 5,790,049
[45] Date of Patent: Aug. 4, 1998

[54] TWO AXIS GIMBAL SUSPENSION WITH WIRELESS SIGNAL AND POWER TRANSFER

[75] Inventor: John P. Harrell, Mission Viejo, Calif.

[73] Assignee: Raytheon Company, Los Angeles, Calif.

[21] Appl. No.: 602,560

[22] Filed: Feb. 20, 1996

[51] Int. Cl.$^6$ .................................................. G08C 17/00
[52] U.S. Cl. ............................... 340/870.28; 340/870.3; 340/870.39; 74/5 R
[58] Field of Search .................... 340/870.01, 870.07, 340/870.3, 870.39, 870.28, 870.16; 248/179.1, 180.1, 182.1, 183.1, 550, 638; 74/5 R, 5.1, 5.5

[56] References Cited

U.S. PATENT DOCUMENTS

| | | |
|---|---|---|
| 4,047,168 | 9/1977 | Fowler .............................. 340/870.39 |
| 4,061,043 | 12/1977 | Stiles .................................... 74/5 R |

*Primary Examiner*—Michael Horabik
*Assistant Examiner*—Andrew Hill
*Attorney, Agent, or Firm*—Leonard A. Alkov; William C. Schubert; Glenn H. Lenzen, Jr.

[57] ABSTRACT

A suspension system permits fine angular adjustment of a gimbal-mounted platform and, in combination with a wireless power and communications transfer system, eliminates the unwanted forces associated with systems which rely upon cables to transfer power and signals between a gimbal platform and its support structure.

11 Claims, 4 Drawing Sheets

TWO AXIS GIMBAL SUSPENSION WITH WIRELESS SIGNAL AND POWER TRANSFER

BACKGROUND OF THE INVENTION

1. Field of the Invention

The invention relates to the field of gimbal-mounted electronics systems.

2. Description of the Related Art

Electronic instruments, particularly those mounted on precision inertial platforms, space sensor gimbals and the precision inner gimbals of multi-gimbal systems, must be directed, or pointed, at their targets with precision and stability. For example, if the instruments are gathering optical data on the electroluminescence within an ocean, a minor misdirection on a space-based platform could mean a substantial location error (on the order of miles) at the ocean's surface.

To avoid pointing errors, instruments are isolated, as much as possible, from their host aircraft such as a satellite, re-entry vehicle or high-altitude airplane. To this end, the cables which provide electronic signal interchange and power transfer between the instrument platform and the aircraft are routed in a manner which minimizes the forces they exert upon the platform.

In spite of the careful arrangement of cables, there are undesirable forces exerted by the cabling system upon the instrument platform. While an actuator system attempts to position the platform in precisely the right orientation, the cables, through frictional and compressive forces, operate to thwart those positioning objectives. The power cable, necessarily a heavy gauge cable, contributes a significant proportion of these frictional and compressive forces.

These forces are particularly onerous because of their unpredictability. Just as the difference between the static and dynamic coefficients of friction makes it difficult to determine the amount of force necessary to reposition (to use an extreme example) a sled that immediately freezes to the ice beneath it whenever it stops moving, the forces exerted by an electrical cable system limit the precision and stability with which an instrument platform system may be repositioned. Neither the cable's static nor dynamic coefficients of friction are well characterized and, consequently, these values cannot be incorporated into the instrument's closed loop positioning systems. Furthermore, they affect the stability of the positioning system; even after the platform has been properly positioned, these forces must be continuously counterbalanced to maintain the platform's preferred position. As a result, the precision with which an optical instrument may locate features on the Earth, or a particle detector may determine the direction from which charged particles arrive at an instrument, is limited.

There are cabling schemes which reduce these frictional and compressive forces. For example, the cables in such systems are arranged to provide some "slack", which can be taken up whenever the platform is repositioned in one direction or let out when repositioned in another. This decoupling of the platform from the support base is effected by a cable arrangement such as a simple series of loops which span the gap between the platform and its support base, or a more elaborate series of coils which provide the same mechanical decoupling function. However, even after taking these precautions, the cabling systems which transfer power and signals between the instrument platform and its support base impress unpredictable, undesirable forces upon the platform.

Considering all the extreme measures taken and the significant expenditures made to achieve the greatest accuracy possible in remote sensing applications, there is a great need to reduce or eliminate the detrimental forces contributed by the power and signal cabling systems which link a platform-based instrument to its off-platform systems, including the host aircraft.

SUMMARY OF THE INVENTION

The invention is directed to an instrument platform system that eliminates the forces exerted by power and signal cables between an instrument platform and the platform's support base.

The invention comprises a support and wireless power and signal transfer system for use with an articulated platform system. Power is transferred from a platform's base to the platform through electrically conductive support members which support the platform from the base and are electrically insulated from both. The support members frictionlessly accommodate small angular movements of the platform with respect to the base, thus permitting precision positioning of the platform. Signals, which may be data or commands, are transmitted across the gap between the platform and its base by a wireless communication system.

The combination of the wireless communication system, which operates across an open gap between the platform and its support base and the transmission of power through the support members, eliminates extraneous physical contact between these structures and thereby eliminates the friction that would otherwise be caused by such contact.

Thus, the platform may be positioned more accurately and, due to greater stability attributable to the minimization of friction, may retain that position for a greater period of time.

BRIEF DESCRIPTION OF THE DRAWINGS

These and other features, aspects, and advantages of the invention will be apparent to those skilled in the art from the following detailed description and accompanying drawings in which.

DETAILED DESCRIPTION OF THE INVENTION

Figure 1A:
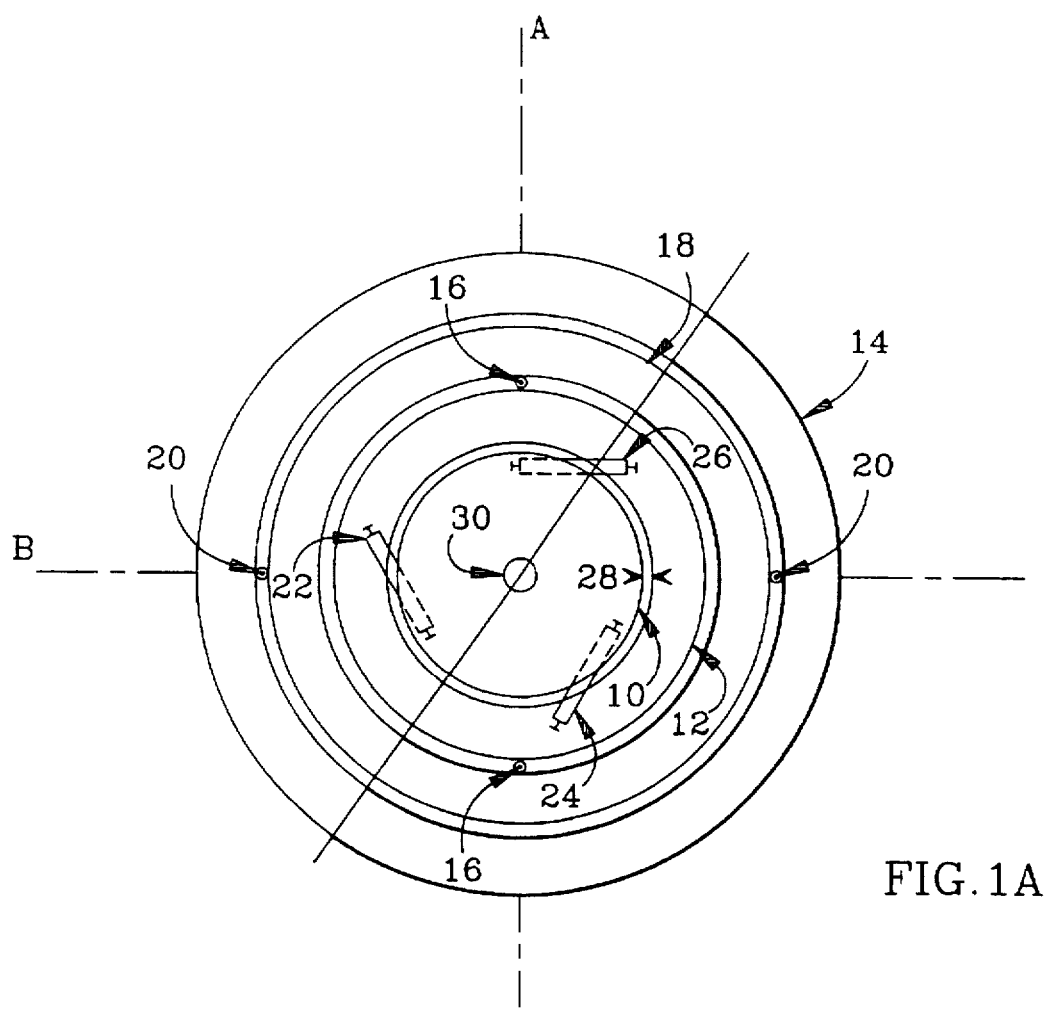
FIG. 1A is a top plan view of a gimbal mounted instrument positioning system in accordance with the invention.

The multi-gimbal systems to which the invention pertains are configured, generally, as illustrated in FIG. 1A.

Typically, gimbal-mounted instruments are affixed to a platform 10 supported by a base 12 which is, in turn, suspended from a multi-gimbal suspension system. The multi-gimbal suspension system provides isolation in two orthogonal axes from a host aircraft's movement. Gimbals are well known in the art. A brief discussion of them may be found in *Van Nostrand's Scientific Encyclopedia*, Seventh Edition, Douglas M. Considine, P. E. Editor, Van Nostrand Reinhold, New York, 1989, at page 1336.

Figure 3:
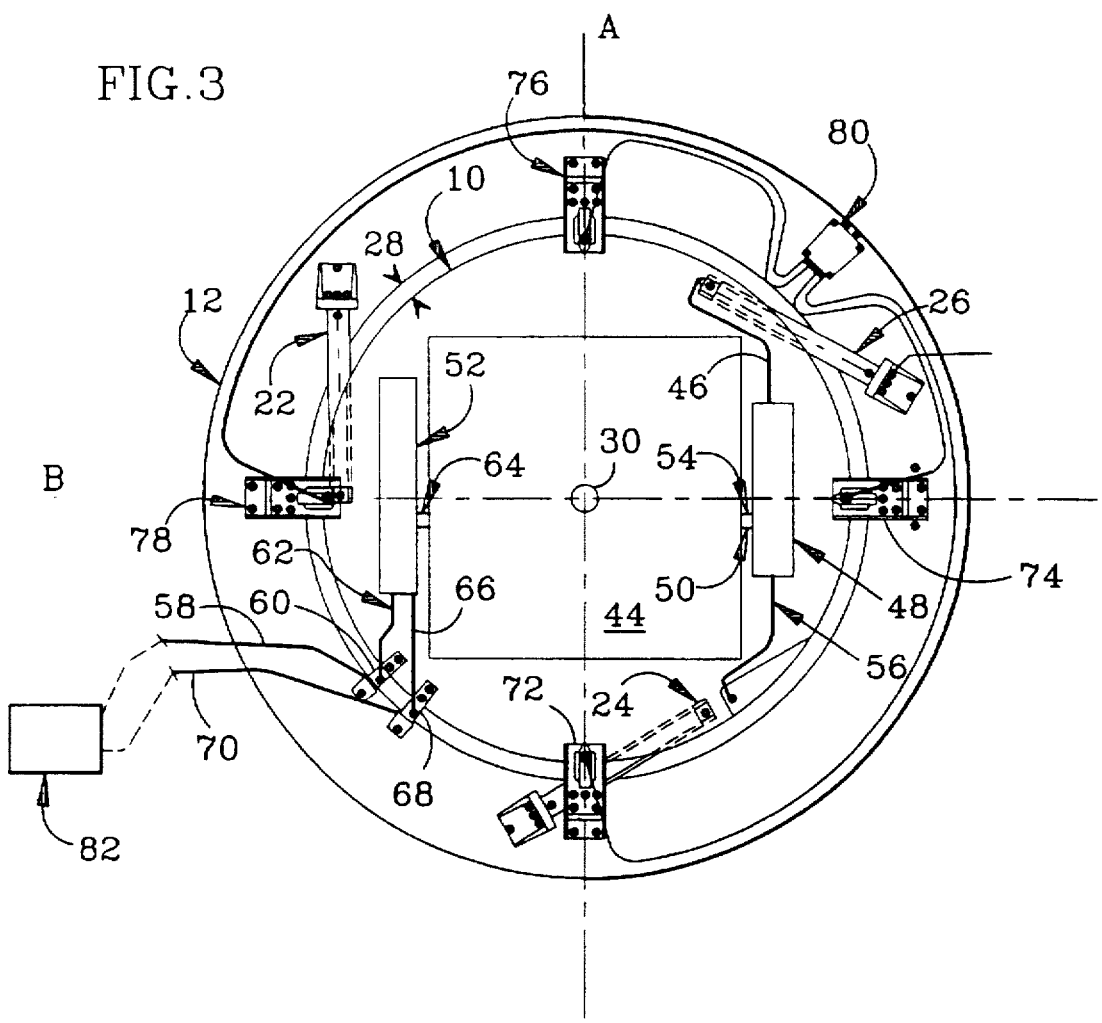
FIG. 3 is a detailed top plan view of the gimbal mounted positioning system of FIG. 1A.

The outer ring 14 of FIG. 1A is attached to a host aircraft. Generally the host is a satellite and the outer ring 14 is attached to the satellite in a fixed position; to point the platform 10 in the direction required by platform-based instruments, the satellite maneuvers itself into approximate orientation. Finer positioning, the operation of which will be discussed in greater detail with respect to FIG. 3, is achieved by relatively small angular movements of the platform 10 with respect to the base 12. The pivots 16 which suspend the next outermost ring 18 from the outer ring 14 permit the ring 18 to rotate freely about the 'A' axis. Similarly, the pivots 20 which suspend the base 12 from ring 18 permit the base 12 to rotate freely about the 'B' axis.

In the preferred embodiment, the platform 10 is suspended from the base 12 by three flexure struts 22, 24 and 26, referred to herein as tangent struts, distributed about the periphery of the platform 10 at 120° intervals coplanar with the top of the base 12 and spanning the platform/base gap 28. The platform 10 is further suspended by a flexure strut 30, referred to herein as an axial strut, attached to and projecting orthogonally from the platform 10 to a section of the base 12, illustrated in FIG. 2A, below. Each tangent strut 22-26 is attached at one end to the top of the base 12, projects across the base/platform gap 28 and into the platform 10 where it is attached at its other end. Each flexure strut as a rigid center section and a rotationally compliant member at each end, which will be described in detail in relation to FIGS. 5A and 5B. This arrangement of struts accommodates small angular excursions of the platform 10 with respect to the base 12, thus permitting precise platform 10 positioning. The platform 10 may be suspended from the base 12 in any orientation, i.e. above, to the side of, or below the base 12.

Figure 1B:
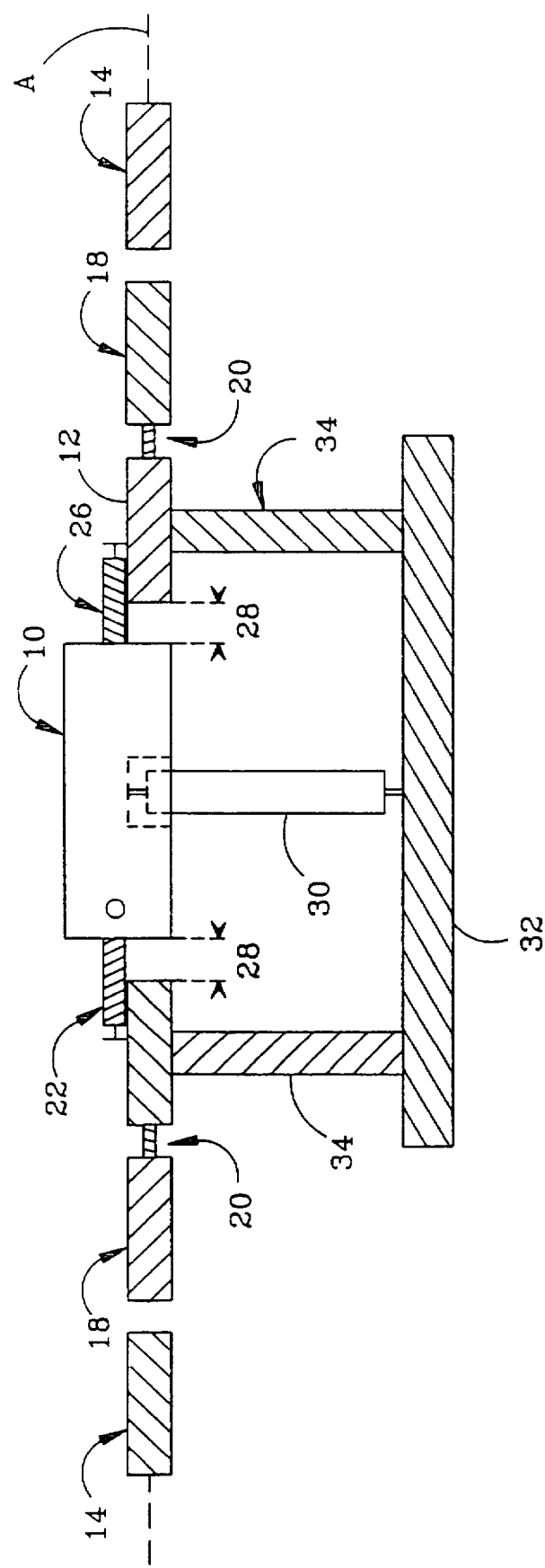
FIG. 1B is a sectional side view of the gimbal mounted instrument positioning system of FIG. 1A.

FIG. 1B illustrates, in greater detail, the physical relationship between the platform 10 and its base 12. The base 12 comprises a ring supported from a base platform 32 by support members 34. The axial strut 30 and tangent struts 22–26, as previously described, suspend the platform 10 from the base 12 in a manner which permits small angular excursions. In particular, the platform 10 is free to move a limited amount with respect to the platform 12 about either axis, A or B, illustrated in FIG. 1A.

Figures 2A, 2B:
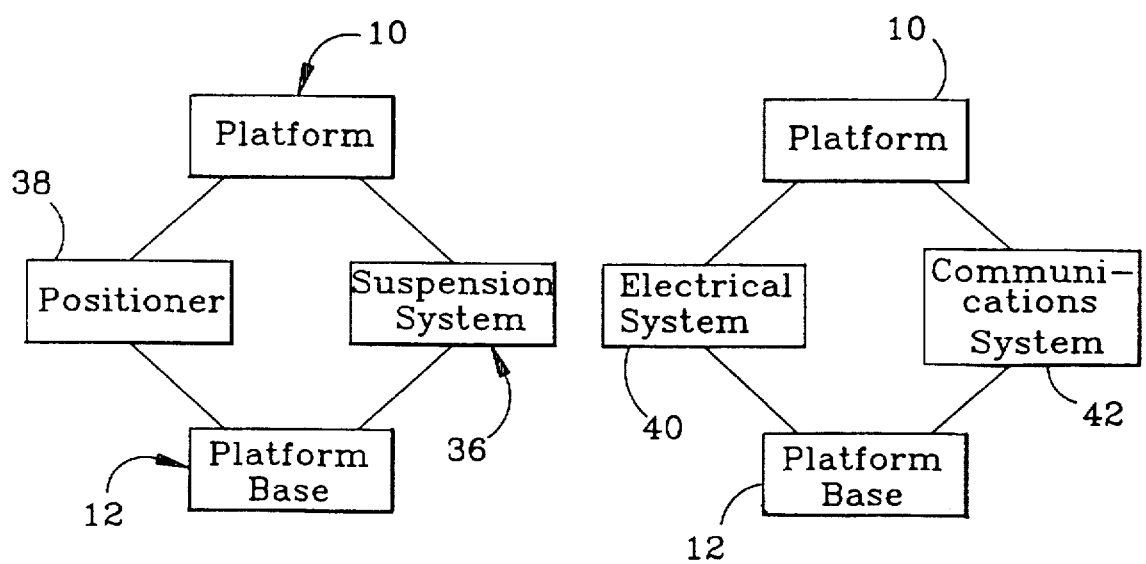
FIG. 2A is a block diagram of the major mechanical components of the instrument positioning system.
FIG. 2B is a block diagram of positioning system's electrical and communications system.

The block diagram of FIG. 2A illustrates the major mechanical components of the gimbal-mounted instrument positioning system and the interplay between them. The platform 10 provides a stable base for instruments such as optical imaging systems, particle detection instruments, inertial measurement units, in short, any instrument which may require highly accurate positioning and stability. The platform 10 is suspended from the base 12 by the suspension system 36 which provides compliant support for the platform 10 while allowing small angular rotations about two perpendicular axes which lie substantially within the plane of the platform 10. The positioner 38 effects the fine angular positioning of the platform 10 relative to the base 12, within the constraints of the suspension system 36.

The platform 10 and base 12 are additionally linked by the electrical 40 and communications 42 systems, as illustrated in FIG. 2B. The communications system 42 is a bidirectional link which relays information between platform-based instruments and off-platform electronics. The electrical system 40 wirelessly conveys power to platform-based instruments from an off-platform power source.

The communications system 42 provides wireless, non-contact, signal communications between the platform 10 and the base 12. Instruments mounted upon the platform 10 employ this communications system 42 to exchange data and control with off-platform electronic systems.

Because the communications system 42 is a wireless, non-contact system and the electrical system 40 transfers power wirelessly, no frictional or other noncompensable forces are introduced by the electrical or the communications systems. In this way, the precision and stability with which the platform 10 is positioned is preserved.

FIG. 3 is a top plan view of one embodiment of the invention. An instrument 44 such as an imager, particle detector or other electronic instrument which requires stable, precise, positioning, is affixed to the platform 10. Generally, such instruments 44 are bolted in place to the platform 10.

As noted in the discussion of FIG. 1A, the suspension system 36 comprises three tangent flexure struts 22–26 and an axial flexure strut 30 which compliantly suspend the platform 10 from the base 12. The flexure struts 22, 24, 26 and 30 are made of an electrically conductive material and are electrically insulated from the platform 10 and the base 12. In addition to their support function, the struts 22, 24, 26 and 30 conduct electrical power to the platform-borne, instrument 44. One flexure strut 26 is connected to the positive side of an off-platform power supply and conveys power to the platform 10. Another flexure strut 24 is connected to the negative side of the power supply and supplies a common, or return, electrical path to the platform 10.

In the preferred embodiment, electrical power is conducted from an off-platform source through the flexure strut 26 across the base-platform gap 28 to the platform 10 where it is conducted via the cable 46 to a power converter 48. The power converter 48 converts power received from the power source to a form required by the particular instrument 44 attached to the platform 10. For example, if the power source provides electrical power at 28 VDC but the instrument 44 requires power at 15, 5 and –15 VDC, the power converter 48 converts the 28 VDC input into the –15, 5, and 15 VDC outputs required by the instrument 44.

After conversion, power is conducted to the instrument 44 through a cable 50 and utilized by the instrument 44 and the optical signal converter 52 which will be discussed in detail below. The electrical return path begins with the cable 54 running from the instrument 44 to the power converter 48 and from there through cable 56 to the flexure strut 24. The flexure strut 24 conducts electricity back to the off-platform power source.

Off-platform electronics send information in the form of optical signals to the instrument 44 through a fiber optic cable 58 in the preferred embodiment, which carries the signals to a pair of beam collimators 60 which face one another across the platform/base gap 28. The beam collimator pair 60 expand, align and collimate signals, and will be described in greater detail in relation to FIG. 6. The optical signals transit the gap 28 and flow through the other beam collimator of the pair 60 and from there into the fiber optic cable 62 and on to the optical signal converter 52. The optical signal converter 52 converts the received optical signals into electrical signals which are then passed on to the instrument 44 through the cabling 64. For a discussion of optical signal converters, fiber optics and their mating connectors that may be used with the invention, see Michael M. Cirovic, and James H. Harter, *Electronic Devices, Circuits, and Systems*, Third Edition, Prentice Hall, 1987, pp.139–141.

The instrument 44 transmits information by sending analog and/or digital electrical signals through the cabling 64 to the optical signal converter 52 where the signals are converted to pulsed optical form. From there, the signals travel along fiber optic cable 66 to one of a second pair of beam collimators 68 which face one another across the platform/base gap 28. The optical signals traverse the gap 28 and are conducted from the beam collimator 68 through the fiber optic cable 70 to the off-platform electronics.

The signals thus transferred may comprise data gathered by the instrument 44, commands sent to the instrument 44 or control signals returned from the instrument 44 to the off-platform electronics.

Because the signals carried by the communications system 42 travel across an open gap 28 between opposing beam collimators 60 and 68, the communications system 42 contributes no frictional or other extraneous forces which would diminish the platform 10 system's positioning accuracy. Additionally, because the signals are preferably digital and the loss of signal power due to movement of the platform 10 and the consequent minor misalignment of the optical paths across the gap 28 is minimal, the signal error rates are very low.

The positioner 38, which is preferably a distributed system of actuator/tilt sensor pairs 72, 74, 76 and 78 and sensor electronics 80, is located as shown in FIG. 3. An off-platform controller 82 employs the actuator/tilt sensor pairs 72, 74, 76 and 78 to determine the position of the platform 10 relative to the base 12 and to effect any required changes in that position.

In the preferred embodiment the tilt sensors are inductive measurement devices which provide non-contact measurements of the distances between the sensors and the platform 10. For a discussion of suitable tilt sensors and their applications see, Harry L. Trietly, *Transducers in Mechanical and Electronic Design*, Marcel Dekker, Inc., 1986, pp. 311–312. The actuators are non-contact voice-coil electromagnetic actuators, model No. LA09-13-000, available from BEI MOTION SYSTEMS COMPANY, San Marcos, Calif. The controller 82 employs the actuators to rotate the platform 10 through small angular excursions about axes A and B, thereby "fine-tuning" the position of the platform 10 with respect to the base 12.

Each sensor 72a–78a is preferably rigidly affixed to the base 12 along an axis, 'A' or 'B', and overhangs, without touching, the platform 10 directly above one of the actuators 72b–78b. The platform 10 is interposed between the sensor and actuator. Each actuator 72b–78b is similarly affixed to the base 12 but spans the platform/base gap 28 underneath the platform 10 and makes contact with the platform 10, so that the platform 10 may be adjusted in fine increments from underneath by an actuator 72b–78b and the resulting position may be measured by an associated tilt sensor 72a–78a located directly above.

Figure 4:
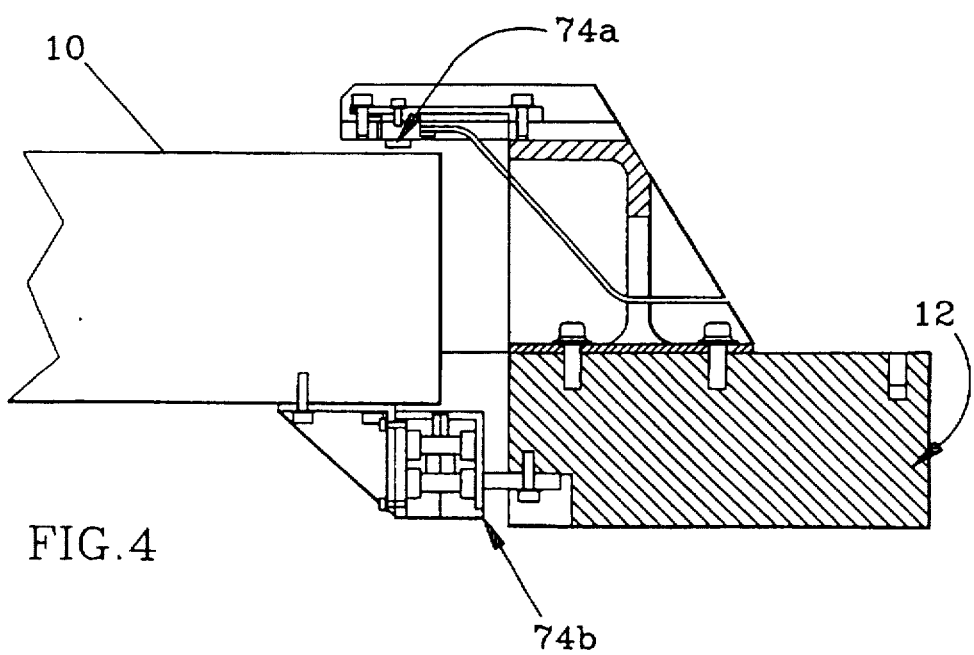
FIG. 4 is a detailed sectional side view of the mechanical relationships among the platform, base, an actuator and a sensor.

A sensor/actuator pair 74a/74b is shown in more detail in FIG. 4. As noted above, the sensor 74a is affixed to the top of the base 12, overhangs the platform 10 without touching it and measures the distance between the sensor 74a and the top of the platform 10. The combination of measurements from four tilt sensors yields a measurement of the position of the platform 10 with respect to the base 12. The actuator 74b is rigidly affixed to the base 12 and contacts the platform 10 as shown to position the platform. The actuator 74b is preferably an electrically operated coil positioner.

Figure 5A:
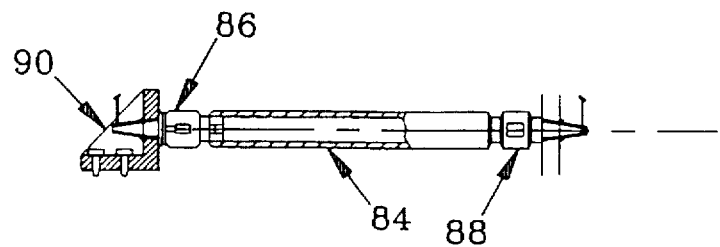
FIG. 5A is a partially sectioned view of a flexure strut and its attachment to the system.

The flexure strut of FIG. 5A preferably comprises a strut tube 84 a with two-axis flexure joint 86, 88 attached to each end. Due to its light weight, ease of machining, low outgassing and good electrical conduction properties, Aluminum is the preferred material for the tube. The flexure joints 86, 88 are composed of PH 13-8MO stainless steel, favored for its electrical conductivity and fatigue resistance characteristics. Each flexure joint 86, 88 is attached to a mounting bracket 90 which is, in turn, attached to either the platform 10 or base 12.

Figure 5B:
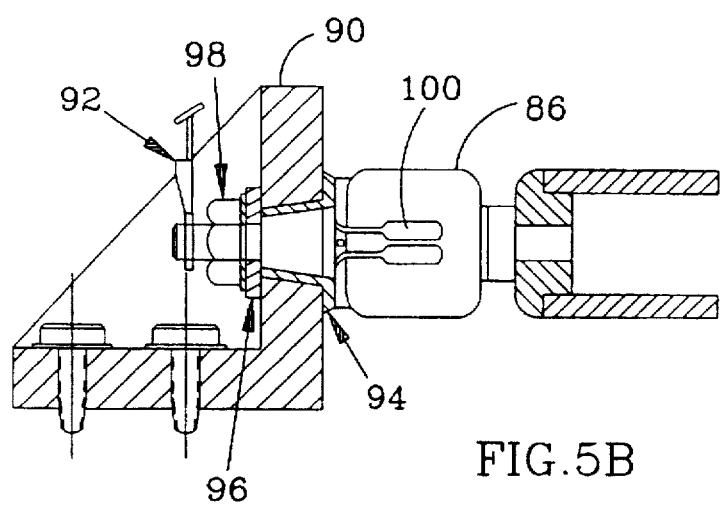
FIG. 5B is an expanded sectional view of a mounting bracket and power attachment employed in the structure of FIG. 5A.

Those flexure struts which act as power conduits are attached, as shown in FIG. 5B, to a mounting bracket 90 and a power attachment 92. The flexure joint 86 is insulated from the bracket 90 by a non-metallic insulating sleeve 94 and an insulating washer 96 and is held in place by a nut 98. The power attachment 92 is a conducting tab held in place on the flexure 86 with electrical contact between the tab and the flexure 86. Each flexure joint 86 is a machined part with two or more thin blade sections 100 in two orthogonal planes which, by bending slightly, serve as frictionless pivots for small angular excursions. Flexure joints are known in the art. For more information regarding them see *P. J. Geary, Flexure Devices, Pivots, Movements*, Suspension, British Scientific Instrument Research Association, 1954.

Figure 6:
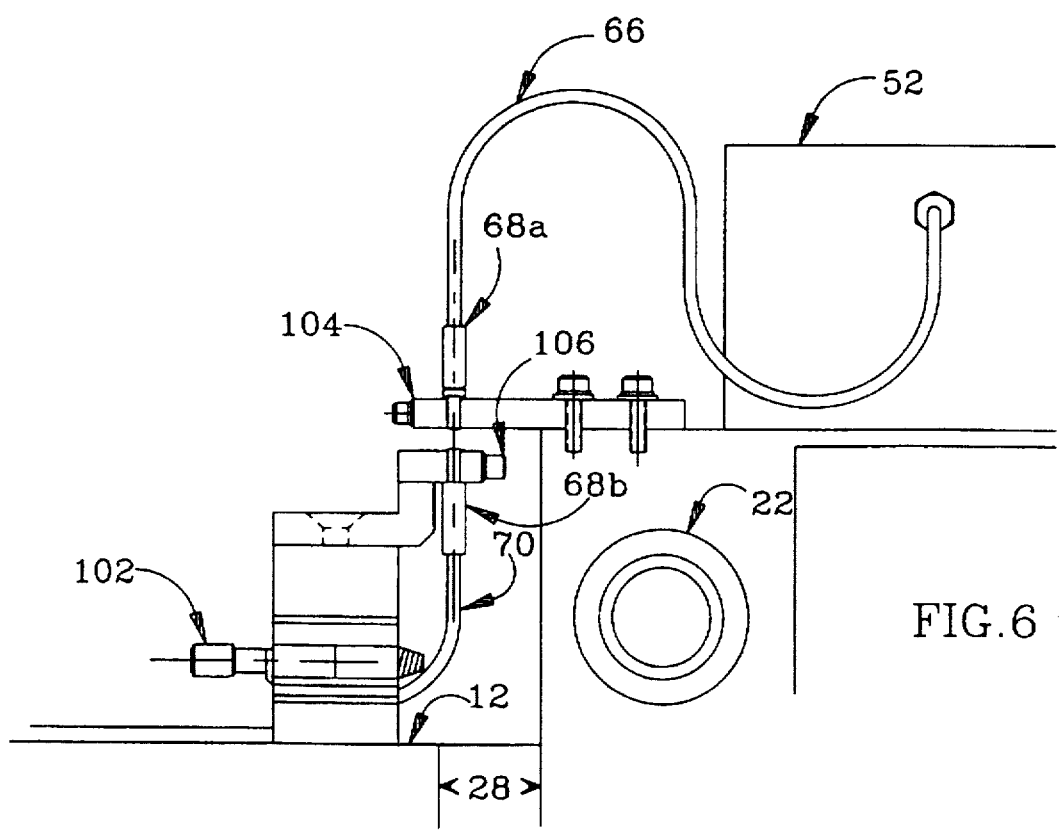
FIG. 6 is an elevation view of the optical communications system's cross-gap interface.

The mechanical relationship of beam collimators, used in the preferred embodiment's communications system 42, is illustrated in greater detail in FIG. 6. The beam collimator pair 68a/68b expands the optical path of light traveling through the fibers 66 and 70 into quasi-collimated beams which aid in the efficient transfer of light across the gap. That is, the beam collimator 68a, attached to optical fiber 66 in a manner which couples substantially all the light traveling in the optical fiber 66 into the beam collimator 68a, expands the beam of light coming from the optical fiber 66. This expanded beam traverses the gap 28 between the beam collimator pair 68a and 68b and is coupled into the collimator 68b. Because the beam is expanded, less alignment precision is required to achieve error-free transmission across the gap 28.

The adjuster 102 relieves strain on the optical fiber 70 and alignment screws 104 and 106 facilitate fine alignment of the beam collimator pair for error-free transmission.

Although the invention has been described in considerable detail, with reference to a preferred embodiment thereof, other embodiments are possible.

For example, if power at one to three distinct voltages were required by the instrument 44 package, the power converter could be eliminated by using up to three of the flexure struts to transmit the required voltages and using one flexure strut as the single return, as illustrated in the discussion of the preferred embodiment.

Further, the platform 10 is illustrated as a solid disk but could take any of a wide variety of forms, solid or discontinuous, with masses attached to counter-balance the mass of the instrument 44.

Although, in the preferred embodiment, the tangent struts project into the platform 10 , they may also be attached to the surface of the platform 10 .

Additionally, although an optical communications system 42 is described in the preferred embodiment, any type of communications system, such as RF or free-space optical (e.g., the infrared devices used in television remote control systems), could be employed. Naturally, such communication systems must meet the electrical interference and power consumption objectives of the instrument 44 system. In particular, a RF system would require shielding to prevent electrical interference with other system components.

The sensor/actuator pairs needn't be placed in opposition to one another, any convenient distribution which yields two-axis actuation and measurement is permissible.

Therefore, the spirit and scope of the appended claims should not be limited to the description of the preferred embodiments contained herein.

I claim:

1. A two axis gimbal mounted instrument positioning system, comprising:

an instrument platform, a platform mounting base, a suspension system suspending said platform from said mounting base, said suspension system providing an electric power transfer path between an instrument mounted on the platform and the mounting base, a wireless communications link which transmits instrument information between said instrument platform and said mounting base, and a signal converter on said platform to complete a communications path between said wireless communications link and an instrument carried on said platform.

2. The positioning system of claim 1 wherein, the suspension system comprises a plurality of electrically conductive members attached at either end to and electrically isolated from the instrument platform and the instrument platform base.

3. The positioning system of claim 2 wherein, the conductive members are flexure struts.

4. The positioning system of claim 3 wherein, two struts are electrically connected to a source of power located off the platform.

5. The positioning system of claim 4 wherein, the communications system comprises an optical data link with a physical gap between the platform and base.

6. A two axis gimbal mounted instrument positioning system, comprising:

an instrument platform, a platform mounting base, a suspension system suspending said platform from said mounting base, a wireless communications link which transmits instrument information between said instrument platform and said mounting base, and a signal converter on said platform to complete a communications path between said wireless communications link and an instrument carried on said platform.

7. The positioning system of claim 6 wherein, said suspension system provides an electric power transfer path between an instrument mounted on the platform and the mounting base.

8. The positioning system of claim 7 wherein, the suspension system comprises a plurality of electrically conductive members attached at either end to and electrically isolated from the instrument platform and the instrument platform base.

9. The positioning system of claim 8 wherein, the conductive members are flexure struts.

10. The positioning system of claim 9 wherein, two struts are electrically connected to a source of power located off the platform.

11. The positioning system of claim 10 wherein, the communications system comprises an optical data link with a physical gap between the platform and base.

* * * * *